US011662964B2

(12) United States Patent
Hosomizo (10) Patent No.: US 11,662,964 B2
(45) Date of Patent: May 30, 2023

(54) STORAGE MEDIUM STORING SUPPORT PROGRAM SUPPORTING GENERAL-PURPOSE PRINTING PROGRAM THAT IS EMBEDDED IN OPERATING SYSTEM INSTALLED IN INFORMATION PROCESSING DEVICE

(71) Applicant: BROTHER KOGYO KABUSHIKI KAISHA, Nagoya (JP)

(72) Inventor: Yoshito Hosomizo, Kitanagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/726,180

(22) Filed: Apr. 21, 2022

(65) Prior Publication Data
US 2022/0342614 A1   Oct. 27, 2022

(30) Foreign Application Priority Data

Apr. 27, 2021   (JP) .............................. JP2021-074927

(51) Int. Cl.
*G06F 3/12*   (2006.01)
(52) U.S. Cl.
CPC .......... *G06F 3/1229* (2013.01); *G06F 3/1203* (2013.01); *G06F 3/1228* (2013.01); *G06F 3/1259* (2013.01)
(58) Field of Classification Search
CPC .... G06F 3/1229; G06F 3/1203; G06F 3/1228; G06F 3/1259
(Continued)

(56) References Cited

U.S. PATENT DOCUMENTS

2005/0128516 A1* 6/2005 Tomita ............... H04N 1/00355
358/448
2011/0161746 A1   6/2011 Ooya
(Continued)

FOREIGN PATENT DOCUMENTS

JP          2011-138394 A     7/2011
JP          2014-78927 A      5/2014
(Continued)

OTHER PUBLICATIONS

International Search Report and Written Opinion issued in corresponding International Patent Application No. PCT/JP2022/018343, dated Jul. 12, 2022.

*Primary Examiner* — Allen H Nguyen
(74) *Attorney, Agent, or Firm* — Merchant & Gould P.C.

(57) ABSTRACT

A non-transitory computer-readable storage medium stores a support program for an information processing device connectable to a printer. In an operating system of the information processing device, a general-purpose printing program corresponding to the printer is embedded. The support program, when executed by a computer of the information processing device, causes the information processing device to perform: acquiring; requesting; and processing. The acquiring acquires, in response to a print instruction being issued from an editing application program, status information from the printer. The requesting requests a displaying application program to display a notification screen by transferring a parameter based on the status information to the displaying application program. In response to the print instruction being issued from the editing application program, the processing processes for transmitting print data based on the print instruction to the printer without waiting for the displaying application program to terminate displaying the notification screen.

11 Claims, 7 Drawing Sheets

(58) Field of Classification Search
USPC .......................................................... 358/1.15
See application file for complete search history.

(56) References Cited

U.S. PATENT DOCUMENTS

| | | | |
|---|---|---|---|
| 2011/0292445 A1* | 12/2011 | Kato | G06F 3/1292 |
| | | | 358/1.15 |
| 2014/0082544 A1 | 3/2014 | Umeizumi | |
| 2017/0060719 A1 | 3/2017 | Ito | |
| 2017/0160997 A1* | 6/2017 | Morita | G06K 15/1822 |
| 2020/0174727 A1* | 6/2020 | Yamada | G06F 3/1231 |
| 2020/0310720 A1 | 10/2020 | Kakitsuba | |
| 2021/0200491 A1 | 7/2021 | Yamada | |

FOREIGN PATENT DOCUMENTS

| | | |
|---|---|---|
| JP | 2017-45200 A | 3/2017 |
| JP | 2020-160989 A | 10/2020 |
| JP | 2020-166350 A | 10/2020 |

* cited by examiner

STORAGE MEDIUM STORING SUPPORT PROGRAM SUPPORTING GENERAL-PURPOSE PRINTING PROGRAM THAT IS EMBEDDED IN OPERATING SYSTEM INSTALLED IN INFORMATION PROCESSING DEVICE

CROSS REFERENCE TO RELATED APPLICATIONS

This application claims priority from Japanese Patent Application No. 2021-074927 filed Apr. 27, 2021. The entire content of the priority application is incorporated herein by reference.

BACKGROUND

In recent years, practical technologies have been developed for controlling printers without the use of a printer driver. One such technology utilizes a general-purpose printing program that is embedded in the operating system (OS) as standard. Upon detecting a printer in this technology, the OS associates the printer with the OS-standard general-purpose printing program. Thereafter, when a print instruction is received for that printer, the OS-standard general-purpose printing program can control printing without the need of a printer driver.

According to another technology known in the art, an information processing device acquires the status of a printer when a print instruction is inputted into the information processing device and issues a notification to the user based on the acquired status. Japanese Patent Application Publication No. 2020-160989 provides an example of a technology for notifying users of a printer's status using an information processing device on which the general-purpose printing program described above has been installed. According to the configuration disclosed in the document described above, the general-purpose printing program starts up an auxiliary program when a print instruction for the general-purpose printing program is received and the auxiliary program acquires status information from the printer and displays a message based on the acquired status information.

SUMMARY

In the above conventional configuration in which the auxiliary program displays a message, the auxiliary program waits until the display of the message is terminated before returning control to the general-purpose printing program at which time the general-purpose printing program transmits print data to the printer. Consequently, this configuration is susceptible to causing delays in the start of printing.

In view of the foregoing, it is an object of the present disclosure to provide a technology for an information processing device on which an OS-standard general-purpose printing program is installed for issuing a notification to the user based on information acquired from a printer while suppressing a delay in the start of printing.

In order to attain the above and other objects, according to one aspect, the present disclosure provides a non-transitory computer-readable storage medium storing a support program for an information processing device connectable to a printer. The information processing device includes: a communication interface; a user interface; a computer; and a memory. The memory stores: an editing application program; a displaying application program; and an operating system. In the operating system, a general-purpose printing program corresponding to the printer is embedded. The support program supports the general-purpose printing program. The support program, when executed by the computer, causes the information processing device to perform: (a) acquiring; (b) requesting; and (c) processing. The (a) acquiring acquires, in response to a print instruction is issued from the editing application program, status information from the printer via the communication interface. The print instruction instructs the general-purpose printing program to execute printing on the printer. The status information indicates a current status of the printer. The (b) requesting requests the displaying application program to display a notification screen for issuing a notification corresponding to the status information acquired in the (a) acquiring by transferring a parameter based on the status information to the displaying application program. The displaying application program is configured to run as a separate process from the editing application program and is capable of displaying the notification screen on the user interface. In response to the print instruction being issued from the editing application program, the (c) processing processes for transmitting print data based on the print instruction to the printer without waiting for the displaying application program to terminate displaying the notification screen.

According to the support program disclosed in this specification, the information processing device acquires status information from a printer when a print instruction has been issued from an editing application program and issues a request to a displaying application program, which runs as a separate process from the editing application program, to display a notification screen corresponding to the acquired status information. Operating independently from the support program as a process separate from the editing application program, the displaying application program displays a notification screen on the user interface in response to this request. Accordingly, the support program and the editing application program may continue processing without having to wait until the display is terminated. Thus, the processing for transmitting print data to the printer based on the print instruction is continued without waiting for the display of the notification screen to be terminated. Hence, a delay in the start of printing can be suppressed, even when a notification is issued based on information acquired from the printer.

According to another aspect, the present disclosure provides an information processing device including: a communication interface; a user interface; a computer; and a memory. The information processing device is connectable to a printer through the communication interface. The memory stores: an operating system; a support program; a displaying application program; and editing application program. In the operating system, a general-purpose printing program corresponding to the printer is embedded. The support program supports the general-purpose printing program. The displaying application program is capable of displaying a notification screen corresponding to status information on the user interface. The status information indicates a current status of the printer. The editing application program is capable of running as a separate process from the displaying application program. The support program, when executed by the computer, causes the information processing device to perform: (a) acquiring; (b) requesting; and (c) processing. The (a) acquiring acquires, in response to a print instruction being issued from the editing application program, status information from the printer via the communication interface. The print instruction instructs the general-purpose printing program to execute printing on the printer. The status information indicates a current status of the printer. The (b) requesting requests the displaying application program to display a notification screen for issuing a notification corresponding to the status information acquired in the (a) acquiring by transferring a parameter based on the status information to the displaying application program. In response to the print instruction being issued from the editing application program, the (c) processing processes for transmitting print data based on the print instruction to the printer. The displaying application program, when executed by the computer, causes the information processing device to perform: (d) displaying. The (d) displaying displays, on the user interface, the notification screen corresponding to the parameter transferred from the support program in the (b) requesting. The (c) processing is performed without waiting for the (d) displaying to terminate displaying the notification screen.

A printing system including the support program described above, an information processing device on which the support program is installed, a computer-readable storage medium for storing the support program, and a control method for implementing the functions of the support program are all novel and useful.

BRIEF DESCRIPTION OF THE DRAWINGS

The particular features and advantages of the disclosure as well as other objects will become apparent from the following description taken in connection with the accompanying drawings, in which.

DETAILED DESCRIPTION

Figure 1:
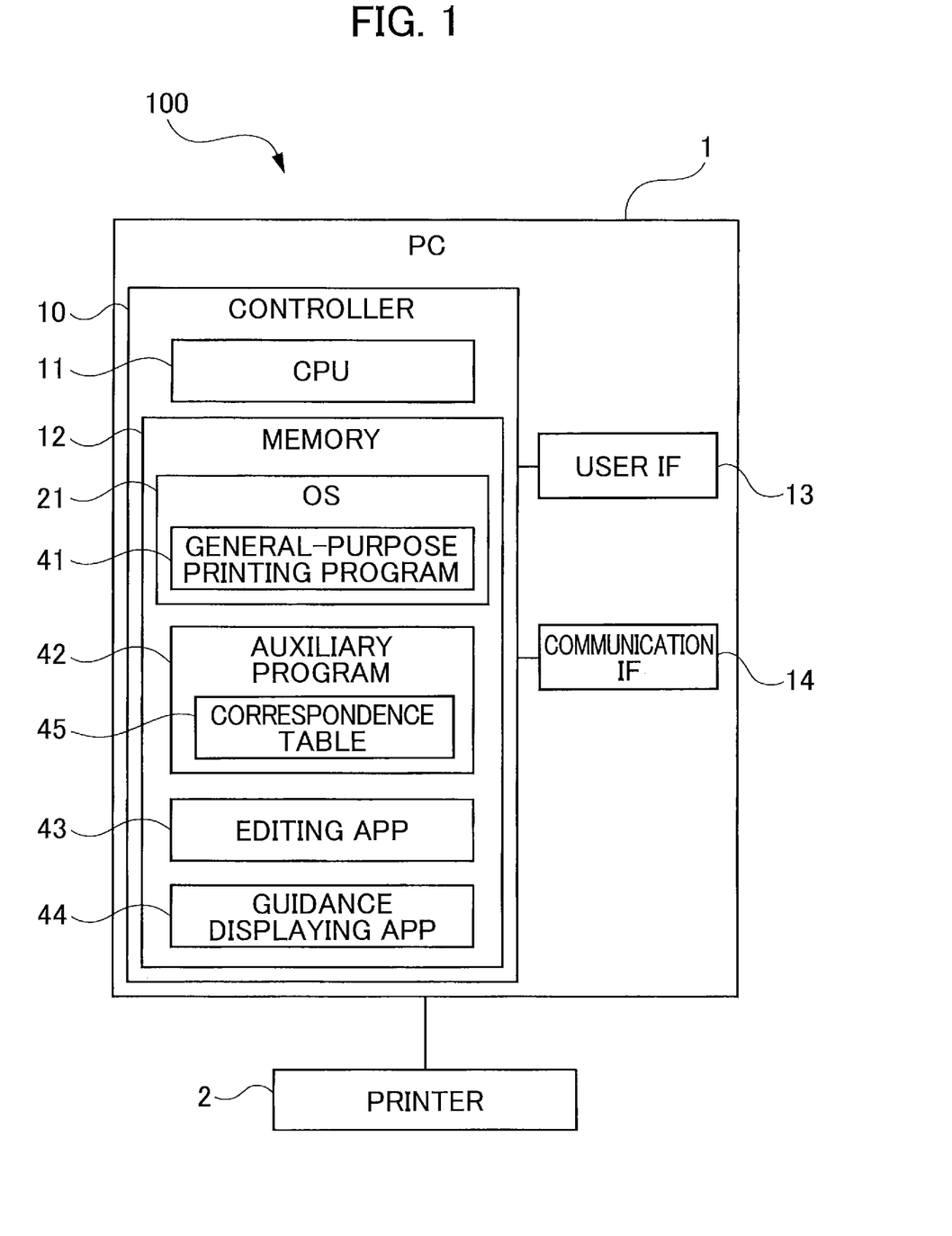
FIG. 1 is a block diagram illustrating the schematic electrical configuration of a printing system.

Next, a first embodiment of the present disclosure will be described while referring to the accompanying drawings. FIG. 1 shows a printing system 100 disclosed in this embodiment. The printing system 100 includes a personal computer (hereinafter referred to as "PC") 1 that uses the support program of the present disclosure, and a printer 2 having a printing function.

As shown in FIG. 1, the PC 1 of this embodiment is provided with a controller 10 that includes a CPU 11 and a memory 12. The PC 1 is an example of the information processing device of the present disclosure. The CPU 11 is an example of the computer of the present disclosure. The PC 1 is also provided with a user interface (also described as "user IF") 13, and a communication interface (also described as "communication IF") 14, both of which are electrically connected to the controller 10. Note that the controller 10 in FIG. 1 is a general concept that covers all hardware and software used for controlling the PC 1 and is not actually limited to representing a single piece of hardware present in the PC 1.

The CPU 11 executes various processes according to programs read from the memory 12 or based on user operations. The memory 12 stores various programs and various data including various application programs (hereinafter referred to as "apps"). The memory 12 is used as a work area for executing various processes. A buffer provided in the CPU 11 is also one example of a memory. Examples of the memory 12 may be a ROM, a RAM, a hard disk drive, or the like built into the PC 1 or may be any storage medium that is readable and writable by the CPU 11, such as a CD-ROM, a DVD-ROM, or other storage media.

The user interface 13 includes hardware that displays screens for reporting information to the user, and hardware that receives operations performed by the user. The user interface 13 may be a set of devices that includes a display capable of displaying information and a mouse, keyboard, and the like with input-receiving functions. Alternatively, the user interface 13 may be a touchscreen that is provided with both a display function and an input-receiving function.

The communication interface 14 includes hardware for communicating with an external device, such as the printer 2. The communication standard employed by the communication interface 14 may be Ethernet, Wi-Fi, Universal Serial Bus (USB), or the like. "Ethernet" is a Japanese registered trademark of FUJIFILM Business Innovation Corp. "Wi-Fi" is a Japanese registered trademark of Wi-Fi Alliance. Alternatively, the PC 1 may be provided with a plurality of communication interfaces 14 supporting a plurality of communication standards.

As shown in FIG. 1, the memory 12 of the PC 1 stores an operating system (hereinafter referred to as "OS") 21, an auxiliary program 42, an editing app 43, and a guidance displaying app 44. The OS 21 includes a general-purpose printing program 41. A correspondence table 45 is included in the auxiliary program 42. The auxiliary program 42 is an example of the support program of the present disclosure. The editing app 43 is an example of the editing application program of the present disclosure. The guidance displaying app 44 is an example of the displaying application program of the present disclosure.

The OS 21 is a multitasking OS capable of performing multiple tasks concurrently by managing and switching among the tasks. The OS 21 may be one of Windows, macOS, Linux, iOS, and Android, for example. "Windows" is a Japanese registered trademark of Microsoft Corporation. "macOS" is a Japanese registered trademark of Apple Inc. "Linux" is a Japanese registered trademark of Linus Torvalds. "iOS" is a Japanese registered trademark of Cisco Technology Inc. "Android" is a Japanese registered trademark of Google Inc.

The general-purpose printing program 41 is an OS-standard program for executing prints on various printers, including the printer 2, in response to user instructions. In the present embodiment, the general-purpose printing program 41 includes a function for generating intermediate image data based on the image data to be printed. Intermediate image data may be XML Paper Specification (XPS) data, for example.

The general-purpose printing program 41 supports functions that are universally available on printers of a plurality of models provided by various printer vendors. The general-purpose printing program 41 does not support all functions that are specific to each of the various printers but rather limits support to generic functions available on all printers.

The auxiliary program 42 is a program or a set of programs that execute processes based on instructions from the OS 21 in conjunction with the process of the general-purpose printing program 41 and is an application program that provides control support for the target hardware. The auxiliary program 42 of the present embodiment supports the model of printer 2 connected to the PC 1. The auxiliary program 42 is started from the general-purpose printing program 41 when the OS 21 receives an instruction to execute a print on the printer 2 using the general-purpose printing program 41, for example. The auxiliary program 42 is called a hardware support application program (HSA), for example.

The auxiliary program 42 can receive various types of commands from the general-purpose printing program 41 and executes various processes based on those commands. The auxiliary program 42 may be a combination of a plurality of programs that each receives execution commands or may be a single program that can execute different processes according to the received command.

The vendor of the printers may prepare auxiliary programs for each type of printer. For example, one auxiliary program may be prepared for inkjet printers and another auxiliary program may be prepared for laser printers. When a new printer is connected to the PC 1, for example, the OS 21 of the PC 1 downloads a suitable auxiliary program for the type of printer that has been connected from a server or the like provided by the vendor and installs the program on the PC 1. Next, the OS 21 stores identification information for the installed auxiliary program in the memory 12 in association with printer information on the newly connected printer. Note that an auxiliary program may be prepared for each model of printer or for each model series rather than each type of printer.

The editing app 43 is used for creating and editing image data and document data, for example. Examples of the editing app 43 include Microsoft Word and Microsoft PowerPoint developed by Microsoft Corporation, or an app developed by the vendor of the printer 2. "Microsoft," "Word," and "PowerPoint" are Japanese registered trademarks of Microsoft Corporation. The editing app 43 can receive print commands via the user interface 13 for executing printing operations on the printer 2, for example.

The guidance displaying app 44 is a program capable of displaying a prescribed notification screen on the user interface 13 based on instructions from the auxiliary program 42. The guidance displaying app 44 of the present embodiment supports a plurality of models including the model of the printer 2 and is provided with a plurality of notification screens that can be displayed on the user interface 13 for each model. The guidance displaying app 44 of the present embodiment should support at least the model of the printer 2 or may be prepared for a series of printer models, for example.

Figure 2:
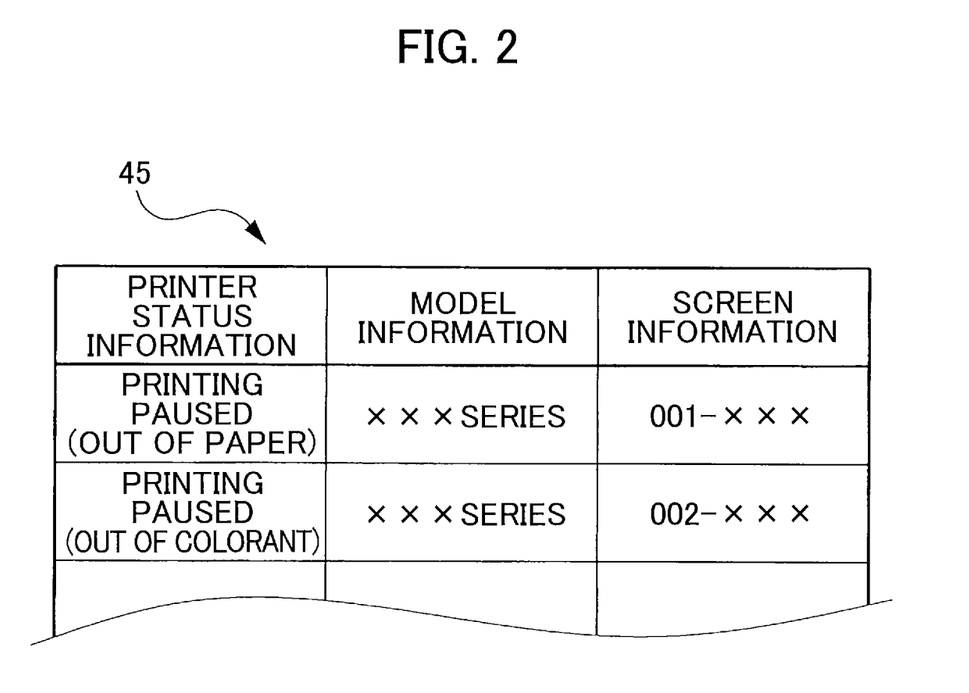
FIG. 2 is an explanatory diagram illustrating an example of a correspondence table.

FIG. 2 shows an example of the correspondence table 45. In this example, the correspondence table 45 stores information associating printer status information including the status of the printer, model information specifying printer models, and screen information specifying notification screens to be displayed with the guidance displaying app 44. Accordingly, the auxiliary program 42 can acquire screen information from the correspondence table 45 based on the printer status information and model information. The guidance displaying app 44 and correspondence table 45 will be described later in detail.

The printer 2 in the present embodiment is a device that possesses a printing function. The PC 1 can communicate with the printer 2 via the communication interface 14. When print data is received from the PC 1 or the like, the printer 2 can execute a print based on the received data.

The printer 2 of the present embodiment has a function for generating printer status information based on the current status of the printer 2 and transmitting the printer status information to an external device in response to a request from that device. The status of the printer 2 may be "printing in progress," "waiting for print data," "printing paused," or "error has occurred," for example. Further, when the status is "printing paused" or "error has occurred," the printer status information includes information specifying the cause.

The printer 2 of the present embodiment may also have a function to generate consumable information specifying the status of consumables accommodated in the printer 2 and to transmit the consumable information to an external device in response to a request from that device. The consumables may be printing paper and colorant, such as ink or toner, for example. Specifically, the consumable information specifies the residual quantity of colorant for each color accommodated in the printer 2, the presence and size of paper accommodated in each paper feed tray, and the like.

Figure 3:
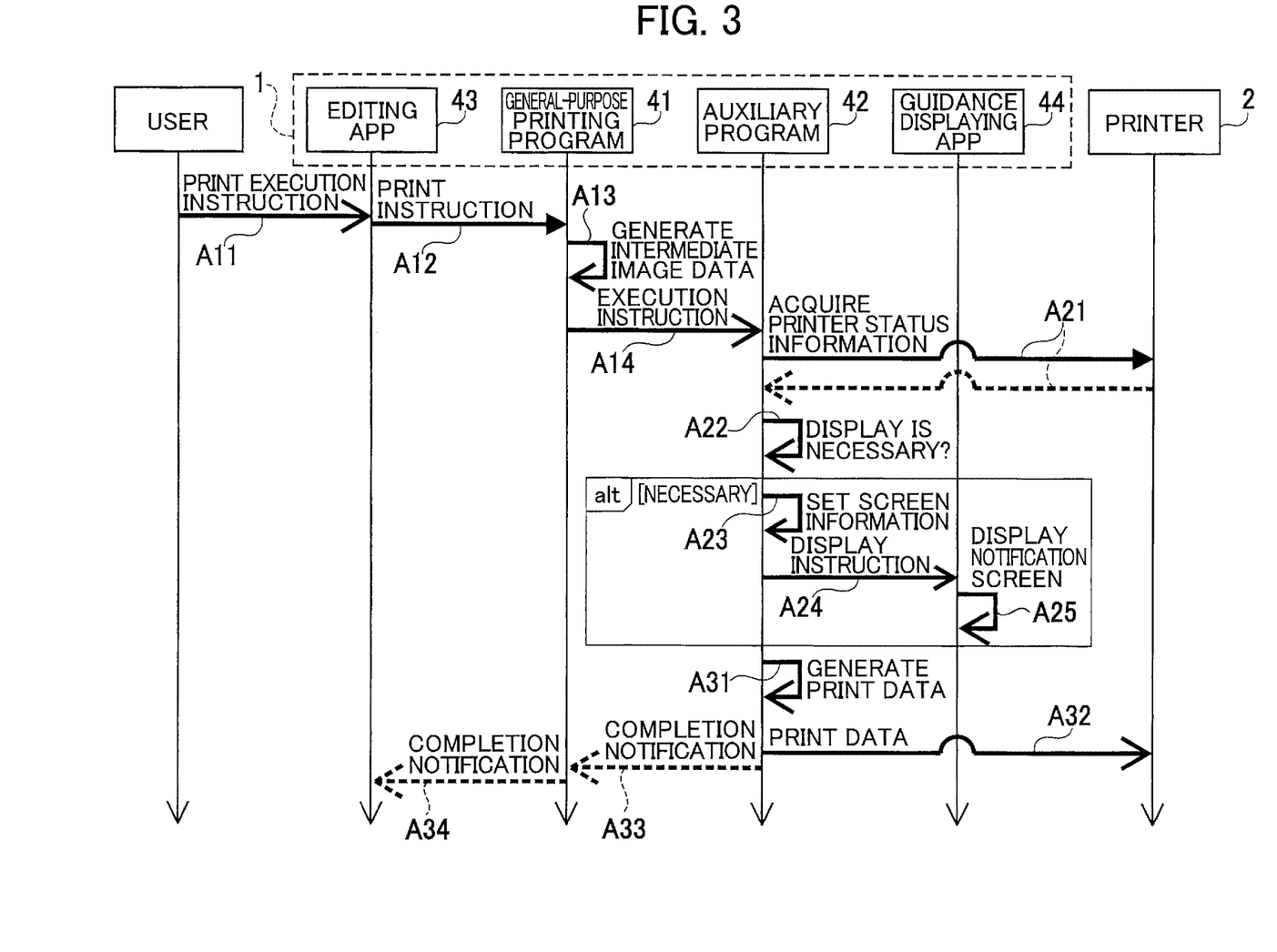
FIG. 3 is a sequence chart illustrating steps showing an example of an operating procedure according to programs performed when a print instruction is received.

Next, a printing procedure that includes operations of the auxiliary program 42 according to the present embodiment will be described with reference to the sequence chart in FIG. 3. FIG. 3 shows operations performed according to each of the programs when the editing app 43 has received a print instruction from a user to print on the printer 2 using the general-purpose printing program 41.

The processes in the present embodiment and each process step in the sequence charts essentially indicate processes performed by the CPU 11 according to commands described in the auxiliary program 42 and other programs. Processes performed by the CPU 11 include hardware control using the API in the OS 21. However, a detailed description of the role of the OS 21 is omitted in this specification when describing operations in the programs. Further, the term "acquire" is used as a concept that does not necessarily require a request.

The editing app 43 receives instructions from the user for creating and editing texts, diagrams, and the like. In A11 of FIG. 3, the editing app 43 receives a print execution instruction from the user for the general-purpose printing program 41 to print an image on the printer 2 based on a selected text or the like. Upon receiving a print execution instruction, in A12 the editing app 43 transfers a print instruction to the general-purpose printing program 41 via the OS 21. From the print instruction, the general-purpose printing program 41 acquires information specifying image data for the image to be printed and information specifying print settings.

In A13 the general-purpose printing program 41 generates intermediate image data by converting the image data included in the received print instruction to the format of intermediate image data and generates a print job that includes this intermediate image data. The general-purpose printing program 41 may receive various types of image data from the editing app 43. The general-purpose printing program 41 converts the image data received from the editing app 43 to intermediate image data suitable for generating print data. If the image data included in the print instruction is already suitable for generating print data, the process of generating intermediate image data may be omitted and the image data may be used in its current form as the intermediate image data.

In A14 the general-purpose printing program 41 outputs an execution instruction to the auxiliary program 42, which is the program corresponding to the printer 2, thereby activating the auxiliary program 42. In the execution instruction, the general-purpose printing program 41 passes the intermediate image data generated in A13 and information on the print settings to the auxiliary program 42.

In A21 the auxiliary program 42 communicates with the printer 2 via the communication interface 14 to acquire printer status information from the printer 2 indicating the current status of the same. The process in A21 is an example of the (a) acquiring of the present disclosure. That is, the auxiliary program 42 issues a request to the printer 2 for printer status information. In response to the request from the auxiliary program 42, the printer 2 returns printer status information to the auxiliary program 42 based on the current status of the printer 2. In the present embodiment, the auxiliary program 42 requests the printer status information and consumable information in A21 and acquires this information from the printer 2. The printer status information and consumable information are examples of the status information of the present disclosure.

The auxiliary program 42 may communicate directly with the printer 2 using a management information base (MIB), for example, or may communicate with the printer 2 via the OS 21. When performing communications via the OS 21, the auxiliary program 42 and printer 2 communicate according to the communication protocol of the OS 21, such as the Internet Printing Protocol (IPP).

In A22 the auxiliary program 42 determines whether a display is necessary based on the printer status information received from the printer 2 and the print settings included in the execution instruction received in A14. Specifically, the auxiliary program 42 determines that a display is necessary when the situation is such that a user operation on the printer 2 is required in order to start printing based on the print data received from the printer 2, that is, when printing cannot be started without receiving a user operation.

For example, the auxiliary program 42 determines that a display is necessary when the status of the printer 2 is "error has occurred" or "printing paused." "Error has occurred" and "printing paused" are examples of the current status that satisfies the prescribed display condition of the present disclosure. When the status of the printer 2 is "error has occurred" or "printing paused," the printer 2 cannot start printing until the cause of the error is resolved. Examples of errors that occur on the printer 2 are "paper jam" and "memory full." The status of the printer 2 also indicates an error when a component of the printer 2, such as the print head or a photosensitive member, must be replaced. Printing may be paused for such reasons as the printer 2 running out of paper or colorant during printing, the cover of the printer 2 being open, or the discharge tray being full.

In addition to the printer status information indicating "error has occurred" or "printing paused," the auxiliary program 42 also determines that a display is necessary when the relationship between the consumable information and the print settings satisfies a prescribed relationship requiring resolution by the user. For example, if the printer 2 has run out of a color (non-black) colorant and the print settings specify color printing, the printer 2 cannot begin printing until the colorant is replenished. In this case, the auxiliary program 42 determines that a display is necessary. On the other hand, if the print settings specify grayscale printing, the printer 2 can begin printing even if a color (non-black) colorant has run out. In this case, the auxiliary program 42 determines that a display is unnecessary. The auxiliary program 42 may also determine that a display is necessary when the paper accommodated in the printer 2 is of a different size than that specified in the print settings.

When the auxiliary program 42 determines that a display is necessary (alt: [necessary]), in A23 the auxiliary program 42 uses the correspondence table 45 to set screen information specifying a notification screen to be displayed on the user interface 13 based on the printer status information acquired in A21 and model information for the printer 2. For example, if the status of a printer 2 having the model name "xxx Series" is "printing paused" and the reason given is "out of paper," the auxiliary program 42 sets the screen information to "001-xxx," based on the example of the correspondence table 45 shown in FIG. 2.

In A24 the auxiliary program 42 transfers this screen information to the guidance displaying app 44, instructing the guidance displaying app 44 to display the notification screen specified by this screen information. The process in A24 is an example of the (b) requesting of the present disclosure. The screen information is an example of the parameter of the present disclosure. Screen information identifies a notification screen to be displayed from among a plurality of notification screens provided in the guidance displaying app 44. The screen information may be a single piece of information specifying the entire notification screen or may be a combination of multiple pieces of information, each specifying information for displaying one part of the notification screen. In A24 the auxiliary program 42 may also pass the consumable information acquired from the printer 2 to the guidance displaying app 44.

Note that when the guidance displaying app 44 is not running, the auxiliary program 42 first starts up the guidance displaying app 44 in A24 before transferring the screen information to the same. By starting up the guidance displaying app 44, the auxiliary program 42 can ensure that the notification screen is displayed.

In A25 the guidance displaying app 44 identifies the notification screen that corresponds to the screen information received from the auxiliary program 42 from among the plurality of prepared notification screens provided in the guidance displaying app 44 and displays this notification screen on the user interface 13. If the notification screen corresponding to the screen information includes an area for displaying residual quantities of consumables and the guidance displaying app 44 has received consumable information from the auxiliary program 42, the guidance displaying app 44 generates an image for displaying residual quantities using the consumable information and displays this image in the area allocated in the notification screen.

Figure 4:
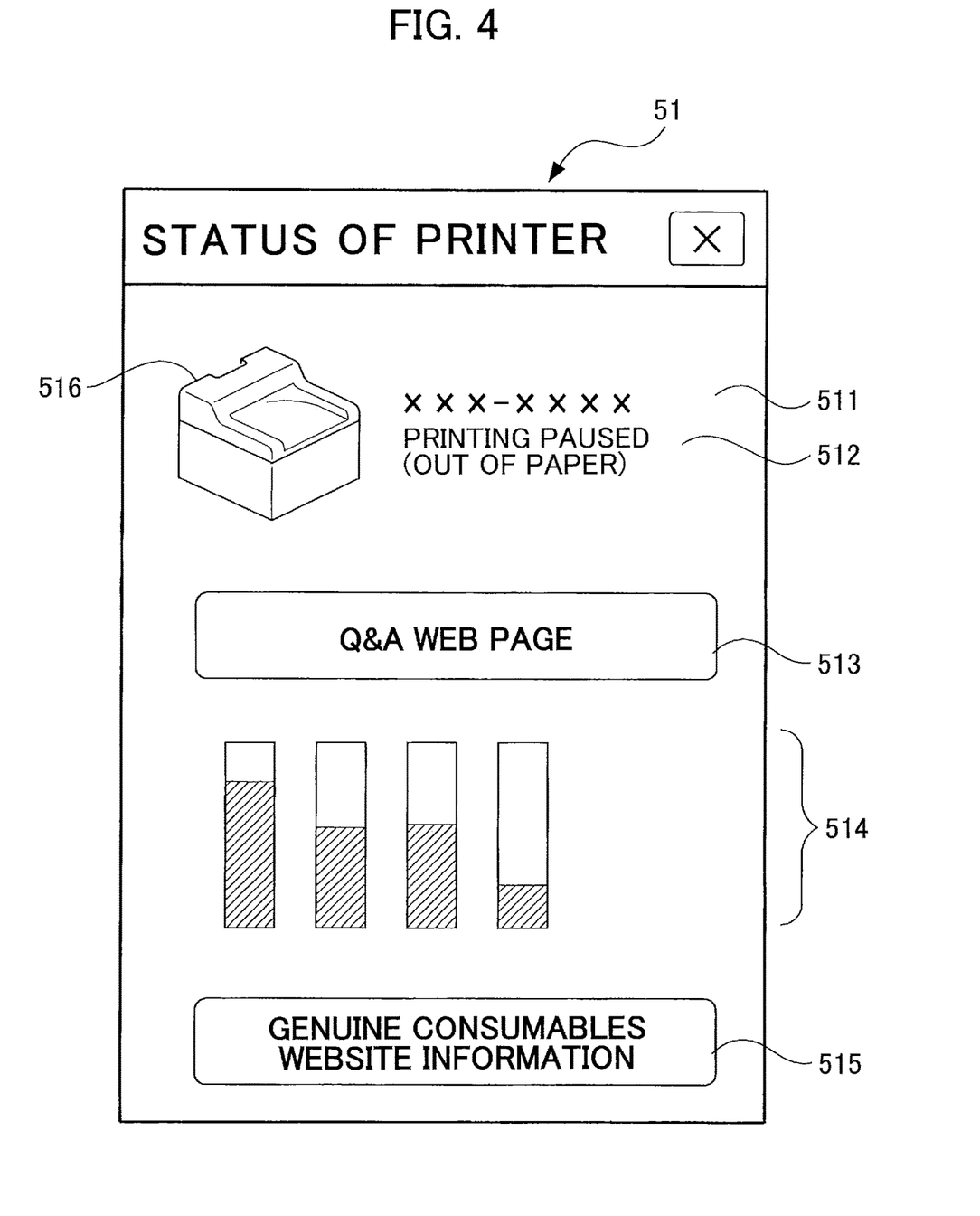
FIG. 4 is an explanatory diagram illustrating an example of a notification screen.

FIG. 4 shows an example of a notification screen 51 displayed by the guidance displaying app 44 when the guidance displaying app 44 receives the screen information "001-xxx". The notification screen 51 shown in FIG. 4 includes a model name 511 for the printer 2, printer status information 512 specifying the status of the printer 2 and the cause for that status, a button 513 that receives an instruction to display a Q&A web page, a residual quantities display area 514 for displaying residual quantities of colorants, a button 515 for receiving an instruction to display a website that supplies genuine consumables, and an image 516 showing the appearance of the printer 2. The guidance app 44 selects the notification screen that includes the model name 511, printer status information 512, and image 516 based on the screen information "001-xxx" and generates the residual quantities display area 514 in the selected notification screen based on the consumable information.

In the printer status information 512 of the notification screen 51 in FIG. 4, a message indicating the status "printing paused" and a message indicating the cause "out of paper" are displayed as information specifying the status of the printer 2 as printing has been paused due to the printer 2 running out of paper. The notification screen 51 may further include information identifying a paper feed tray that runs out of paper and an image illustrating the method of loading paper. The residual quantities of colorant for respective colors are displayed in the residual quantities display area 514 as color bars, for example.

The buttons 513 and 515 accept instructions to display prescribed pages from a website provided by the vendor of the printer 2. The guidance displaying app 44 stores information specifying a prescribed URL corresponding to each button. When an operation on the button 513 or button 515 is received, the guidance displaying app 44 launches a browser and transfers the prescribed URL to the browser based on the stored information to display the corresponding web page on the user interface 13. Information stored in the guidance displaying app 44 may be information for each model of printer. This information may be the URL itself or may be information specifying the storage location of the URL.

The notification screen 51 may further include a residual quantity display indicating the quantity of paper remaining in each paper feed tray, an image or message explaining how the printer 2 is used, an advertisement or the latest information on related products, and the like. For example, if the status of the printer 2 is "cover open," the guidance displaying app 44 may display an image in the notification screen 51 showing the cover in its open position.

Even when the guidance displaying app 44 supports a plurality of models, the guidance displaying app 44 can display a suitable notification screen that is different for each model of printer through the simple process by receiving screen information corresponding to the printer model. Hence, the guidance displaying app 44 can provide more detailed information suited to the model of printer and can display a notification screen that is easier to understand.

The guidance displaying app 44 is a program that runs as a separate process from the editing app 43. However, the general-purpose printing program 41 and auxiliary program 42 are programs that run within the process of the editing app 43. That is, the guidance displaying app 44 and auxiliary program 42 can run concurrently. Thus, if the auxiliary program 42 determines that the display is necessary, after transferring a display instruction to the guidance displaying app 44 in A24 the auxiliary program 42 can continue on to the next process, irrespective of how processing by the guidance displaying app 44 is progressing. For example, the auxiliary program 42 continues executing processes even if the guidance displaying app 44 receives an operation on the button 513 or button 515 and begins displaying the corresponding web page.

After the auxiliary program 42 outputs a display instruction to the guidance displaying app 44 in A24, in A31 the auxiliary program 42 generates print data based on the intermediate image data and print settings received in A14. In A32 the auxiliary program 42 transmits the print data generated in A31 to the printer 2 together with a print command instructing the printer 2 to execute a print. On the other hand, if the auxiliary program 42 determines in A22 that a display is unnecessary, the auxiliary program 42 skips the processes in A23 and A24 and directly executes the processes in A31 and A32. The processes in A31 and A32 are an example of the (c) processing for transmitting print data based on the print instruction to the printer of the present disclosure. As a result, the printer 2 creates printed matter. If printing is paused on the printer 2 when the printer 2 receives print data transmitted in A32, the printer 2 waits for the cause of the printing pause to be resolved before printing.

As described above, the auxiliary program 42 determines whether the display is necessary based on the printer status information or the relationship between the consumable information and the print settings. The auxiliary program 42 issues an instruction to display a notification screen when determining that the display is necessary and does not issue an instruction to display the notification screen when determining that the display is unnecessary. If the status of the printer 2 is "printing in progress" or "waiting for print data," for example, the auxiliary program 42 determines in A22 that a display is unnecessary and does not launch the guidance displaying app 44. This configuration reduces the frequency that notification screens are displayed and lessens the annoyance caused when notification screens with low importance are displayed. Note that the auxiliary program 42 may transfer a display instruction to the guidance displaying app 44 to display residual quantities of colorants and the printing progress, even when the display is unnecessary.

As an alternative, the general-purpose printing program 41 may generate the print data in place of the auxiliary program 42 generating the print data. That is, the auxiliary program 42 may transfer the intermediate image data, information on print settings, and information for executing a print to the general-purpose printing program 41. The general-purpose printing program 41 may then generate print data based on the intermediate image data and print settings received from the auxiliary program 42 and pass this print data to the auxiliary program 42.

The print data generated by the general-purpose printing program 41 is in a format, such as PWG Raster data or PDF data, that can be used for printing on a variety of printers. Generating print data using the general-purpose printing program 41 reduces the processing load on the auxiliary program 42, thereby preventing an increase in processing time and allowing for a smaller sized auxiliary program 42.

On the other hand, the auxiliary program 42 generates print data in a format that can be used for printing on the printer 2, such as PDL data exclusive to the model of the printer 2. Generating print data using the auxiliary program 42 corresponding to the printer 2 can increase the processing flexibility of the printer 2 or reduce the processing load on the printer 2 compared to when print data is generated using the general-purpose printing program 41.

Additionally, the general-purpose printing program 41 may be responsible for transmitting print data and the like to the printer 2. In other words, the auxiliary program 42 may pass generated print data to the general-purpose printing program 41 so that the PC 1 transmits the print data to the printer 2 as the transmission destination. In this case, the general-purpose printing program 41 transmits the print data received from the auxiliary program 42 to the printer 2 via the OS 21.

The printer 2 may also possess a function for rasterizing the intermediate image data. When the printer 2 possesses a rasterization function, the auxiliary program 42 may transmit a print command that includes the intermediate image data for the image being printed and the print settings to the printer 2 without generating print data for the image being printed.

The process of generating print data and the process of transmitting print data or intermediate image data to the printer 2 are an example of the process for transmitting print data to a printer based on a print command, regardless of whether the executing entity is the auxiliary program 42, the general-purpose printing program 41, or the printer 2. The auxiliary program 42 and general-purpose printing program 41 in the present embodiment can continue their respective processes irrespective of how processing by the guidance displaying app 44 is progressing.

After all the print data has been transmitted, in A33 the auxiliary program 42 notifies the general-purpose printing program 41 that processing is complete. As a result, in A34 the general-purpose printing program 41 ends the process for the print instruction received in A12 and notifies the editing app 43 that processing is complete. By receiving the completion notification from the general-purpose printing program 41, the editing app 43 enters a state capable of receiving another instruction from the user, such as an instruction to edit or print another document, even if the guidance displaying app 44 is still processing.

The auxiliary program 42 may also acquire printer status information from the printer 2 after transmitting the print data and prior to notifying the general-purpose printing program 41 that processing is complete and may transfer a display instruction to the guidance displaying app 44 based on the acquired status. For example, if authentication information has been added to the print data transmitted to the printer 2, the printer 2 waits for authentication information to be inputted. Hence, the auxiliary program 42 may instruct the guidance displaying app 44 to display an image showing how to input the authentication information. When the printer 2 receives print data to which authentication information has been added, the printer 2 temporarily stores this print data in a memory and does not begin printing until the printer 2 has received input matching the authentication information added to the print data.

Figure 5:
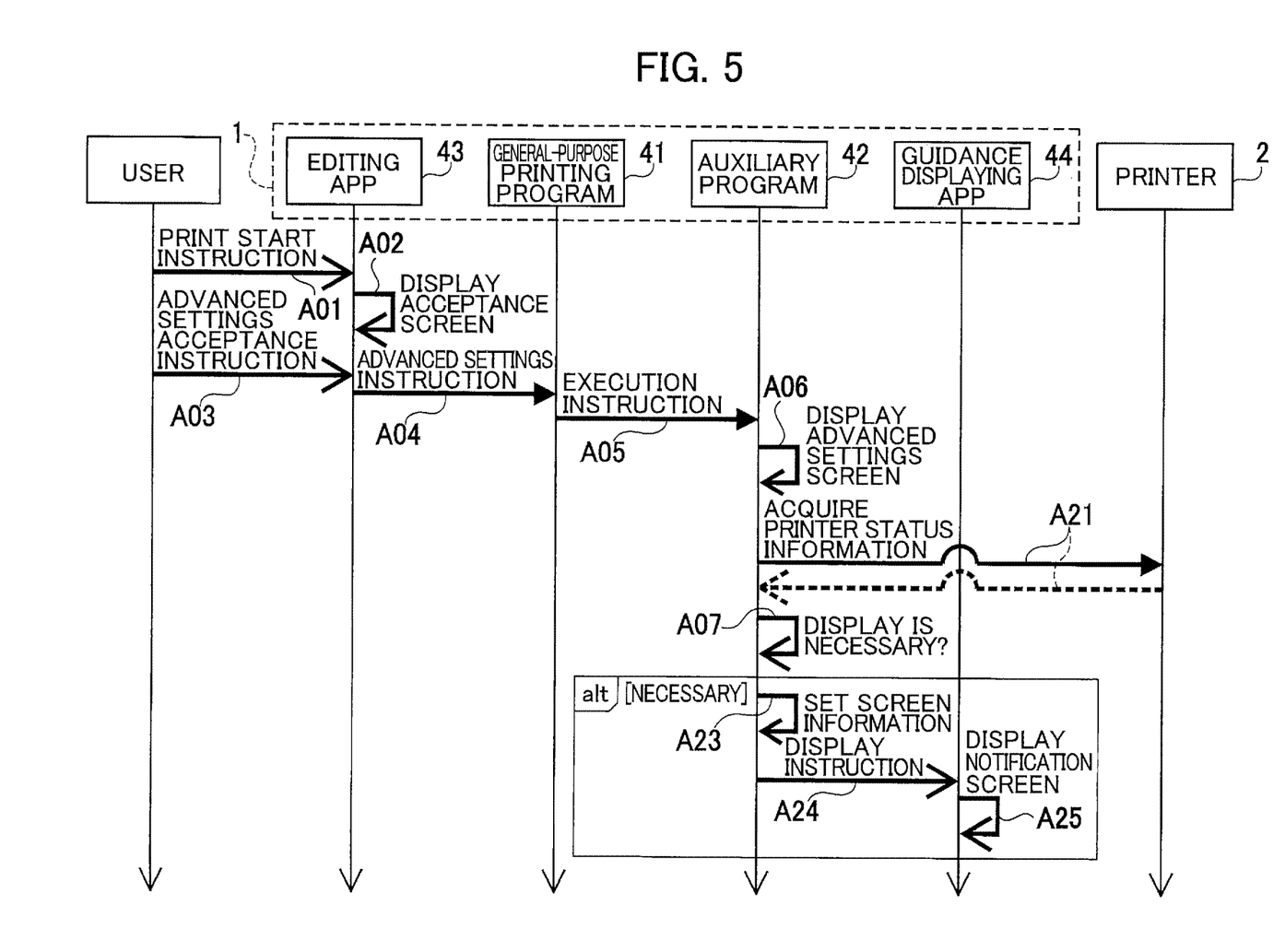
FIG. 5 is a sequence chart illustrating steps showing an example of an operating procedure according to the programs performed when an instruction for advanced print settings is received.

Prior to issuing an instruction to execute a print, the editing app 43 may also display a print screen on the user interface 13 for accepting printing-related instructions and may accept an instruction to begin receiving advanced print settings. Advanced print settings are print settings that use functions specific to the printer 2, for example, and include print settings that cannot be accepted by the editing app 43. Even if an instruction for advanced print settings is received, the editing app 43 executes the general-purpose printing program 41 and auxiliary program 42. The auxiliary program 42 may then acquire printer status information from the printer 2, even when an instruction for advanced print settings has been received.

Operating procedures according to the programs performed when an instruction for advanced print settings is received will be described with reference to the sequence chart in FIG. 5. The procedure shown in the sequence chart of FIG. 5 is executed prior to the procedure shown in FIG. 3. In the following description, steps identical to those in the sequence chart of FIG. 3 are designated with the same step numbers to avoid duplicating description.

In A01 the editing app 43 accepts an instruction to start a printing-related procedure while the printer 2 is currently selected. Upon receiving this print start instruction, in A02 the editing app 43 displays a screen on the user interface 13 for receiving printing-related instructions. In A03 the editing app 43 receives an instruction to begin accepting advanced print settings in this acceptance screen. In this case, in A04 the editing app 43 transfers information on the received instruction to the general-purpose printing program 41. In A05 the general-purpose printing program 41 launches the auxiliary program 42 corresponding to the printer 2 and passes an execution instruction to the auxiliary program 42 instructing the auxiliary program 42 to accept advanced print settings.

In A06 the auxiliary program 42 begins operations based on the execution instruction received from the general-purpose printing program 41 and displays an advanced settings screen on the user interface 13 for accepting advanced print settings. The process in A06 is an example of the (e) displaying of the present disclosure. Additionally, in A21 the auxiliary program 42 issues a request to the printer 2 via the communication interface 14 for printer status information and consumable information and acquires this information from the printer 2. In this case, the process in A21 is an example of the (a) acquiring of the present disclosure, and an example of the (f) issuing of the present disclosure.

In A07 the auxiliary program 42 determines whether a display is necessary based on the acquired printer status information. For example, the auxiliary program 42 determines that a display is necessary if the status of the printer 2 is "error has occurred" or "printing paused." Since print settings have not been set by the timing of A07, the auxiliary program 42 does not determine the necessity of a display based on the consumable information and the print settings, unlike in the determination of A22 of FIG. 3.

If the auxiliary program 42 determines that a display is necessary (alt: [necessary]), in A23 the auxiliary program 42 uses the correspondence table 45 to set screen information specifying the notification screen to be displayed based on the printer status information that must be displayed and the model information for the printer 2. In A24 the auxiliary program 42 further transfers a display instruction including this screen information to the guidance displaying app 44. In this case, the process in A24 is an example of the (d) starting of the present disclosure, and an example of the (g) requesting of the present disclosure. The screen information is an example of the parameter of the present disclosure. In A25 the guidance displaying app 44 displays the notification screen based on the received screen information on the user interface 13.

If the notification screen is displayed prior to a print instruction being received, the user can determine based on this notification screen whether to issue a print instruction as is. Consequently, the user can be expected to complete operations or work more quickly. As an example, if the status of the printer 2 is "out of paper", the user can be expected to load paper promptly. Printing can also be expected to be completed more quickly by accepting an instruction to change the printer or an instruction to modify print settings from color printing to grayscale printing according to the status of the printer 2 and the consumable information.

If the auxiliary program 42 determines in A07 that a display is unnecessary or after the auxiliary program 42 outputs a display instruction to the guidance displaying app 44 in A24, the auxiliary program 42 performs subsequent processes (not shown). Specifically, the auxiliary program 42 accepts user operations in the advanced settings screen displayed in A06 and sets print settings based on the received operations. Further, when the auxiliary program 42 receives a user instruction to quit the advanced print settings, the auxiliary program 42 notifies the general-purpose printing program 41 that processing has ended. In response, the general-purpose printing program 41 notifies the editing app 43 that the advanced settings instruction received in A04 has been completed. Upon receiving this completion notification from the general-purpose printing program 41, the editing app 43 enters a state capable of receiving another instruction from the user, such as a print execution instruction.

As described above in detail, the auxiliary program 42 of the present embodiment acquires printer status information from the printer 2 when a print instruction has been received from the editing app 43 and instructs the guidance displaying app 44 in a process separate from the process of the editing app 43 to display a notification screen corresponding to the acquired printer status information. As a result, the auxiliary program 42 and editing app 43 can continue processing without waiting for the end of the display. For example, the auxiliary program 42 can continue a process for transmitting print data based on the print instruction to a printer without waiting for the display of the notification screen to terminate, thereby suppressing a delay in the start of printing.

Figure 6:
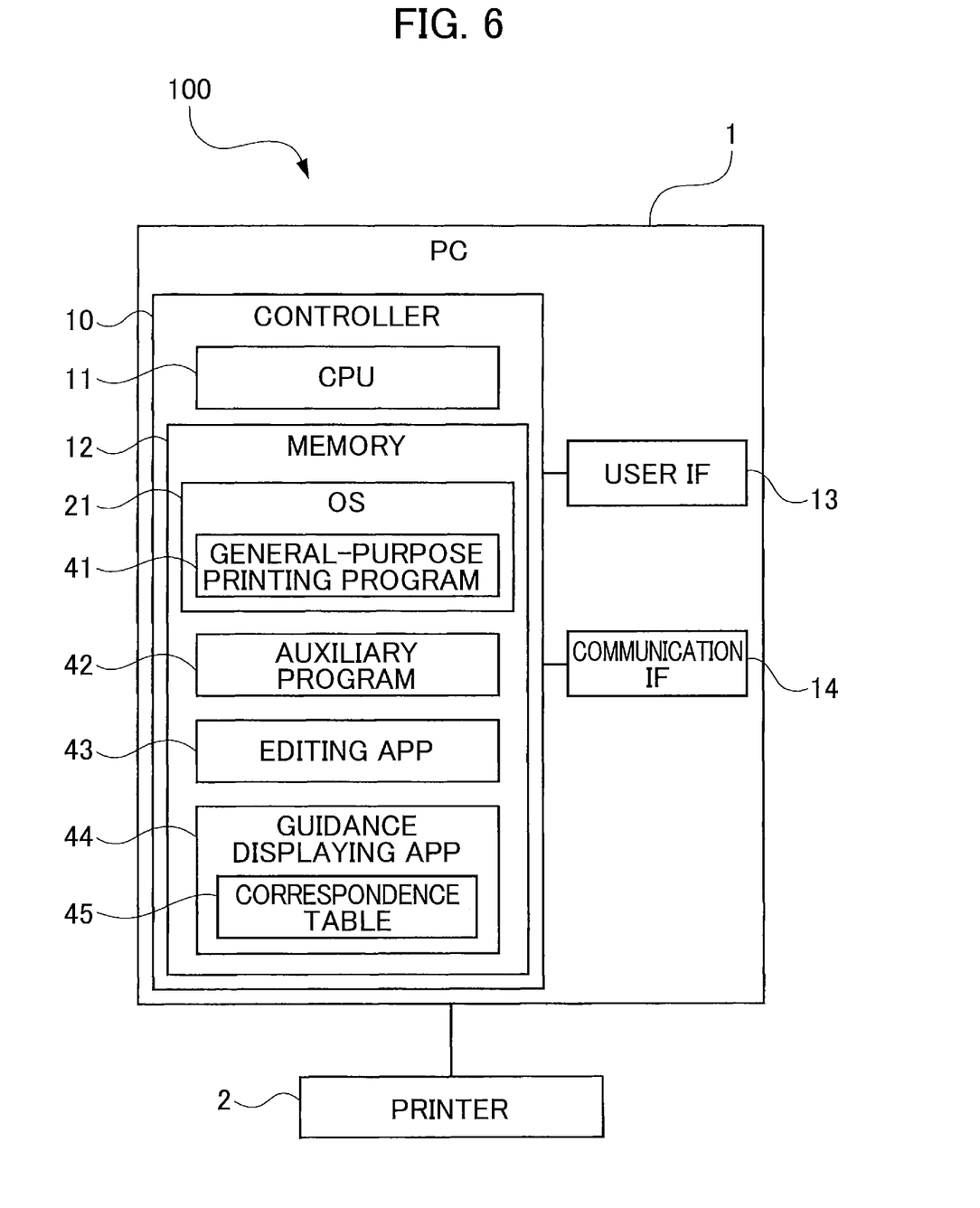
FIG. 6 is a block diagram illustrating the schematic electrical configuration of a printing system.

Next, a second embodiment of the present disclosure will be described in detail while referring to the accompanying drawings. The printing system 100 of the second embodiment also includes the PC 1 and printer 2. However, the correspondence table 45 in this embodiment is provided in the guidance displaying app 44 of the printing system 100, as shown in FIG. 6. Thus, the second embodiment differs from the first embodiment only in the program that uses the correspondence table 45. Since the structures and processes in the second embodiment are otherwise identical to those in the first embodiment, the same reference numerals and step numbers will be used in the second embodiment as those used in the first embodiment and a description of these structures and processes will be simplified.

More specifically, while the auxiliary program 42 uses the correspondence table 45 to set screen information in the first embodiment, the guidance displaying app 44 uses the correspondence table 45 to set screen information in the second embodiment. The content of the correspondence table 45 in the present embodiment is identical to that in the first embodiment. Next, the procedures implemented by the programs in the second embodiment will be described with reference to the sequence chart in FIG. 7. In the procedure shown in FIG. 7, the guidance displaying app 44 executes steps A22 through A23 in the procedure shown in FIG. 3.

Figure 7:
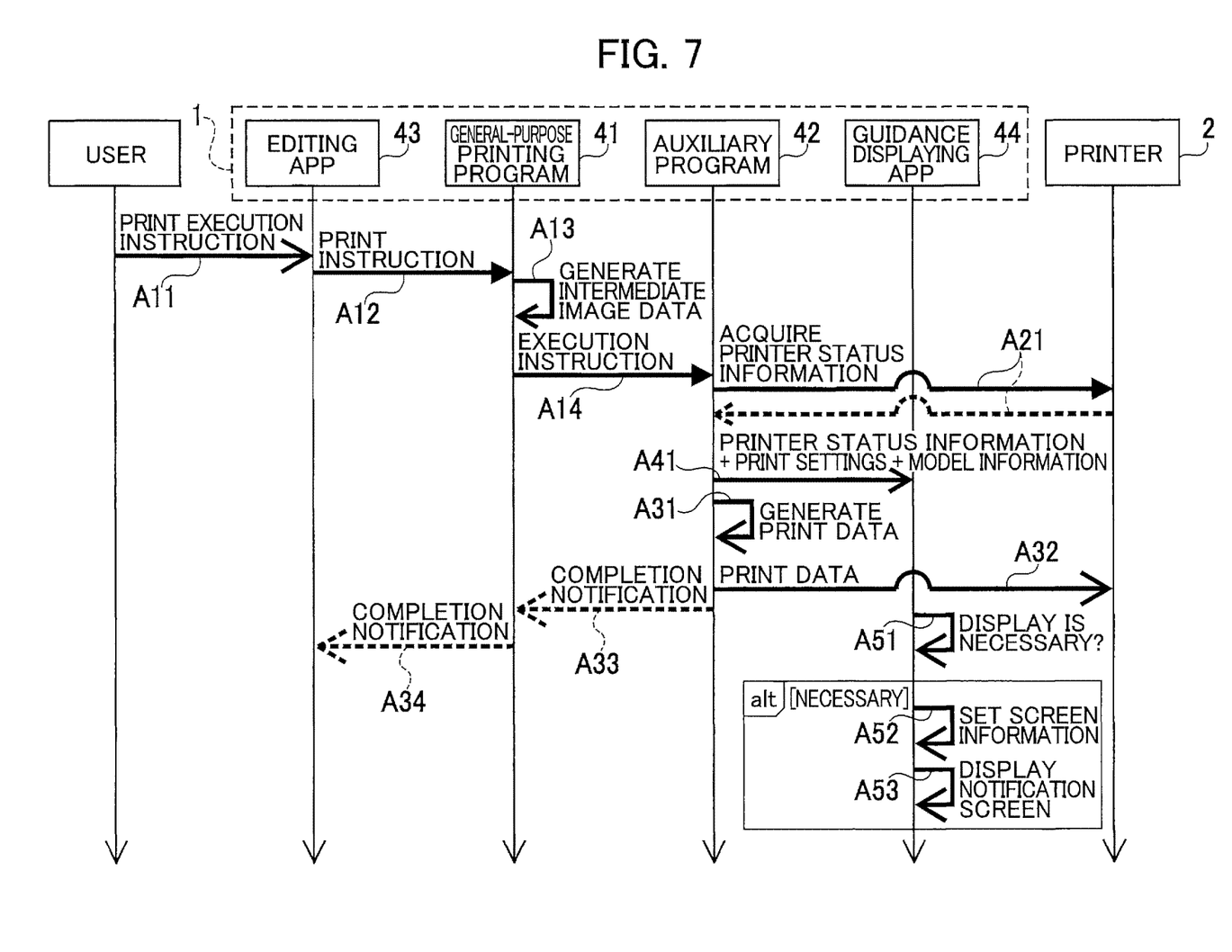
FIG. 7 is a sequence chart illustrating steps showing an example of an operating procedure according to programs performed when a print instruction is received.

In A11 of FIG. 7, the editing app 43 receives an instruction from the user to execute a print and in A12 transfers a print instruction to the general-purpose printing program 41. In A13 the general-purpose printing program 41 generates intermediate image data based on the print instruction and in A14 transfers an execution instruction to the auxiliary program 42. In A21 the auxiliary program 42 acquires printer status information and consumable information from the printer 2.

In A41 the auxiliary program 42 passes the printer status information acquired from the printer 2 to the guidance displaying app 44, directing the guidance displaying app 44 to display a notification screen. The process of A41 is an example of the (b) requesting of the present disclosure. In A41 of the present embodiment, the auxiliary program 42 also transfers the print settings received in A14 with the execution instruction, the model information on the printer 2, and the consumable information acquired in A21 to the guidance displaying app 44. The information transferred to the guidance displaying app 44 in A41 that includes the printer status information is an example of the parameter of the present disclosure. Note that, if the guidance displaying app 44 is not running at the time, the auxiliary program 42 starts up the guidance displaying app 44 in A41.

After directing the guidance displaying app 44 to display a notification screen, the auxiliary program 42 continues executing the next process. Thus, in A31 the auxiliary program 42 generates print data and in A32 transmits the print data to the printer 2. In A33 the auxiliary program 42 also notifies the general-purpose printing program 41 that processing is complete, and in A34 the general-purpose printing program 41 notifies the editing app 43 that processing is complete. As an alternative, the general-purpose printing program 41 may generate and transmit the print data.

In the present embodiment, the processes performed with the auxiliary program 42 and general-purpose printing program 41 following A31 are also an example of the (c) processing for transmitting print data based on the print instruction to the printer of the present disclosure. Thus, the auxiliary program 42 and general-purpose printing program 41 of the present embodiment can continue their respective processes, irrespective of how processing by the guidance displaying app 44 is progressing.

In the meantime, in A51 the guidance displaying app 44 determines whether a display is necessary based on the information received from the auxiliary program 42 in A41. Specifically, the guidance displaying app 44 determines that the determination in A51 is necessary when the information received in A41 does not include screen information. Alternatively, the auxiliary program 42 may transfer an instruction to the guidance displaying app 44 in A41 directing the guidance displaying app 44 to determine the necessity for a display.

The process performed with the guidance displaying app 44 in A51 may be the same process as that performed with the auxiliary program 42 in A22 of FIG. 3. Note that the guidance displaying app 44 executes the determination in A51 as a separate process from the editing app 43 and is not restricted to a timing following the process in A32 in sequence. That is, the process in A51 may be performed before the process in A32, after the process in A32, or concurrently with the process in A32.

If the guidance displaying app 44 determines that a display is necessary (alt: [necessary]), in A52 the guidance displaying app 44 uses the correspondence table 45 provided in the guidance displaying app 44 to set screen information specifying the notification screen to be displayed based on the information received in A41. The process performed with the guidance displaying app 44 in A52 is identical to the process performed by the auxiliary program 42 in A23 of FIG. 3. In A53 the guidance displaying app 44 displays the notification screen on the user interface 13 based on this screen information. On the other hand, if the guidance displaying app 44 determines in A51 that a display is unnecessary, the guidance displaying app 44 skips the processes in A52 and A53 and, hence, does not display a notification screen.

By using the guidance displaying app 44 to determine the necessity of a display, the auxiliary program 42 can quickly execute the process for generating and transmitting print data. On the other hand, when the auxiliary program 42 determines this necessity, the guidance displaying app 44 is executed less frequently, decreasing processing load on the guidance displaying app 44.

Note that the auxiliary program 42 may perform the processes up to and including the determination of necessity for a display, and the guidance displaying app 44 may set the screen information specifying the notification screen to be displayed. Specifically, if the auxiliary program 42 determines that a display is necessary in the determination of A22 shown in the procedure of FIG. 3, the auxiliary program 42 may transfer the same information described in A41 of FIG.

7 together with an instruction to display a notification screen to the guidance displaying app 44. In this case, the process in A51 of FIG. 7 is omitted, and the guidance displaying app 44 executes the processes in A52 and A53 to display the notification screen.

As described above in detail, the printing system 100 according to the second embodiment can suppress a delay in the start of printing, as with the first embodiment. If the guidance displaying app 44 is provided with the correspondence table 45, sets a notification screen being displayed, and displays the notification screen as described in the second embodiment, the notification screen being displayed can be flexibly modified by the guidance displaying app 44. On the other hand, if the auxiliary program 42 sets the screen information as described in the first embodiment, the guidance displaying app 44 merely displays a screen based on received information, which amounts to a simple process.

Further, with the printing system 100 according to the first and second embodiments, the guidance displaying app 44, which is provided separately from the auxiliary program 42, possesses information on notification screens, and the auxiliary program 42 entrusts the guidance displaying app 44 to display the notification screen. Accordingly, when the content of a notification screen must be changed to update a product advertisement or the latest information in the display, for example, the vendor of the printer 2 can make such changes by updating the guidance displaying app 44 without having to modify the auxiliary program 42. Since the auxiliary program 42 implements a common process for displaying all notification screens, a single standard auxiliary program 42 can be developed, thereby not requiring the development of a plurality of auxiliary programs 42 for different notification screens.

The embodiments disclosed in this specification are merely examples and are not intended to limit the present disclosure in any way. Therefore, it would be apparent to those skilled in the art that various improvements and modifications may be made to the technology disclosed in this specification without departing from the spirit of the disclosure. For example, the device connected to the PC 1 is not limited to a printer, but may be a multifunction peripheral, a copier, a fax machine, or any other device having a printing function. Further, the number of devices included in the printing system 100 may be any number of two or greater and is not limited to the example shown in the drawings.

Further, the notification screen shown in the drawings is just one example. Therefore, the arrangement and numbers of messages and buttons displayed in the notification screen are not limited to the example in the drawing. Further, while the notification screen is displayed in the embodiments only when a user operation is required, a notification screen may be displayed whenever a print instruction is received, regardless of the printer status.

Further, the guidance displaying app 44 may be configured to be capable of communicating with the printer 2, for example. When the auxiliary program 42 receives an execution instruction, for example, the auxiliary program 42 may activate the guidance displaying app 44 and the guidance displaying app 44 may acquire printer status information from the printer 2. The guidance displaying app 44 may also be capable of accepting an instruction from the user to cancel printing. When an instruction to cancel printing is received, the guidance displaying app 44 may transmit a cancel command to the printer 2.

Further, while the guidance displaying app 44 is provided with various notification screens in the first and second embodiments, the guidance displaying app 44 may acquire some information for notification screens from an external device. For example, if the printer 2 is provided with information on an image showing the appearance of the printer 2, the guidance displaying app 44 may acquire this information from the printer 2 and integrate the image into the notification screen being displayed.

Further, while model information is included in the correspondence table 45 in the above description, model information need not be included in the correspondence table 45 if the guidance displaying app 44 is provided for only one model or model series of printers 2. As an alternative, the correspondence table 45 may be stored on a server or other external device. In this case, the auxiliary program 42 or guidance displaying app 44 may use the correspondence table 45 by first acquiring the correspondence table 45 from the external device.

The guidance displaying app 44 is also not limited to a program that is started in response to an instruction from the auxiliary program 42 but may be a resident program in the PC 1. Further, the guidance displaying app 44 may be capable of accepting a display instruction from a program other than the auxiliary program 42, such as a printer driver or other program that performs special operations on the printer 2. Additionally, the guidance displaying app 44 may be provided with both the functions described in the first embodiment and the functions described in the second embodiment. In this case, the guidance displaying app 44 may determine whether a display is necessary based on the acquired parameters.

In the embodiments described above, only printing operations have been described in detail as the operations of the auxiliary program 42, but the auxiliary program 42 may have other roles. Further, the program that executes the processes described in the embodiments is not limited to the auxiliary program 42 but may be another program that receives instructions from the OS 21 or the general-purpose printing program 41 when printing is performed using the general-purpose printing program 41. For example, a print workflow application program having specifications published by Microsoft Corporation may be used as the program.

The execution timing of the auxiliary program 42 is not limited to the examples in the embodiments. For example, the auxiliary program 42 may be executed in response to execution instructions received directly from the OS 21. Alternatively, the auxiliary program 42 may be a resident program, in which case the auxiliary program may perform the operations described above upon receiving an execution command.

In any of the sequence charts disclosed in the embodiments, the plurality of processes that make up any of the plurality of steps may be executed in parallel, or the order in which the processes are performed may be modified in any way that does not produce any inconsistencies in the processes.

The processes disclosed in the embodiments may be executed by a single CPU, a plurality of CPUs, an ASIC or other hardware, or a combination of these components. Further, the processes disclosed in the embodiments may be achieved through a storage medium that stores the programs used to implement those processes or according to any of various other methods or formats.

What is claimed is:

1. A non-transitory computer-readable storage medium storing a support program for an information processing device connectable to a printer, the information processing device including: a communication interface; a user interface; a computer; and a memory storing: an editing application program; a displaying application program; and an operating system in which a general-purpose printing program corresponding to the printer is embedded, the support program supporting the general-purpose printing program, the support program, when executed by the computer, causing the information processing device to perform:

(a) acquiring, in response to a print instruction being issued from the editing application program, status information from the printer via the communication interface, the print instruction instructing the general-purpose printing program to execute printing on the printer, the status information indicating a current status of the printer;

(b) requesting the displaying application program to display a notification screen for issuing a notification corresponding to the status information acquired in the (a) acquiring by transferring a parameter based on the status information to the displaying application program, the displaying application program being configured to run as a separate process from the editing application program and being capable of displaying the notification screen on the user interface; and in response to the print instruction being issued from the editing application program, (c) processing for transmitting print data based on the print instruction to the printer without waiting for the displaying application program to terminate displaying the notification screen.

2. The non-transitory computer-readable storage medium according to claim 1, wherein the support program, when executed by the computer, causes the information processing device to further perform:

in a case where the displaying application program is not running when the print instruction is issued, (d) starting up the displaying application program prior to performing the (b) requesting.

3. The non-transitory computer-readable storage medium according to claim 1, wherein the displaying application program is configured to support a plurality of printer models and is capable of displaying a plurality of notification screens corresponding to respective ones of the plurality of printer models, the plurality of notification screens being different from each other, and wherein the (b) requesting includes requesting the displaying application program to display one of the plurality of notification screens corresponding to a printer model of the printer.

4. The non-transitory computer-readable storage medium according to claim 3, wherein the (b) requesting includes transferring the parameter and model information specifying the printer model of the printer to the displaying application program, the displaying application program being configured to determine a content of the notification screen based on the parameter and the model information transferred from the support program.

5. The non-transitory computer-readable storage medium according to claim 3, wherein the (b) requesting includes: determining a content of the notification screen based on the status information and the printer model of the printer; and transferring, as the parameter, screen information specifying the content of the notification screen to the displaying application program, the displaying application program being configured to display the notification screen based on the screen information.

6. The non-transitory computer-readable storage medium according to claim 1, wherein the support program, when executed by the computer, causes the information processing device to further perform:

(e) displaying on the user interface a setting screen for accepting a print setting to be used when the printing is executed on the printer;

(f) issuing a request to the printer via the communication interface for the status information to acquire the status information; and (g) requesting the displaying application program to display the notification screen for issuing the notification corresponding to the status information, by transferring the parameter based on the status information acquired in the (f) issuing to the displaying application program.

7. The non-transitory computer-readable storage medium according to claim 1, wherein the support program, when executed by the computer, causes the information processing device to further perform:

(h) determining whether the status information acquired in the (a) acquiring satisfies a prescribed display condition, wherein the (b) requesting and the (c) processing are performed in response to determining in the (h) determining that the status information satisfies the prescribed display condition, and wherein the (c) processing is performed without the (b) requesting being performed in response to determining in the (h) determining that the status information does not satisfy the prescribed display condition.

8. The non-transitory computer-readable storage medium according to claim 1, wherein the support program, when executed by the computer, causes the information processing device to further perform:

(i) determining whether the status information acquired in the (a) acquiring and a print setting set in the print instruction satisfy a prescribed relationship, wherein the (b) requesting and the (c) processing are performed in response to determining in the (i) determining that the status information and the print setting satisfy the prescribed relationship, and wherein the (c) processing is performed without the (b) requesting being performed in response to determining in the (i) determining that the status information and the print setting do not satisfy the prescribed relationship.

9. The non-transitory computer-readable storage medium according to claim 1, wherein the (b) requesting includes transferring the parameter based on the status information acquired in the (a) acquiring to the displaying application program, the displaying application program being configured to determine whether the parameter satisfies a prescribed display condition, wherein the displaying application program displays the notification screen corresponding to the parameter in a case where the parameter satisfies the prescribed display condition, and wherein the displaying application program is configured not to display the notification screen in a case where the parameter does not satisfy the prescribed display condition.

10. The non-transitory computer-readable storage medium according to claim 1, wherein the (b) requesting includes transferring the parameter based on the status information acquired in the (a) acquiring and a print setting set in the print instruction to the displaying application program, the displaying application program being configured to determine whether the parameter and the print setting satisfy a prescribed relationship, wherein the displaying application program is configured to display the notification screen corresponding to the parameter in a case where the parameter and the print setting satisfy the prescribed relationship, and wherein the displaying application program is configured not to display the notification screen in a case where the parameter and the print setting do not satisfy the prescribed relationship.

11. An information processing device comprising:

a communication interface through which the information processing device is connectable to a printer;

a user interface;

a computer; and a memory storing:
- an operating system in which a general-purpose printing program corresponding to the printer is embedded;
- a support program supporting the general-purpose printing program;
- a displaying application program capable of displaying a notification screen corresponding to status information on the user interface, the status information indicating a current status of the printer; and
- an editing application program capable of running as a separate process from the displaying application program, wherein the support program, when executed by the computer, causes the information processing device to perform:
- (a) acquiring, in response to a print instruction being issued from the editing application program, status information from the printer via the communication interface, the print instruction instructing the general-purpose printing program to execute printing on the printer, the status information indicating a current status of the printer;
- (b) requesting the displaying application program to display a notification screen for issuing a notification corresponding to the status information acquired in the (a) acquiring by transferring a parameter based on the status information to the displaying application program; and
- in response to the print instruction being issued from the editing application program, (c) processing for transmitting print data based on the print instruction to the printer, wherein the displaying application program, when executed by the computer, causes the information processing device to perform:
- (d) displaying, on the user interface, the notification screen corresponding to the parameter transferred from the support program in the (b) requesting, wherein the (c) processing is performed without waiting for the (d) displaying to terminate displaying the notification screen.

* * * * *